United States Patent [19]

Takahashi

[11] Patent Number: 4,856,293
[45] Date of Patent: Aug. 15, 1989

[54] AIR-CONDITIONING CONTROL SYSTEM FOR AUTOMOTIVE VEHICLES

[75] Inventor: Tadahiro Takahashi, Konan, Japan

[73] Assignee: Diesel Kiki Co., Ltd., Saitama, Japan

[21] Appl. No.: 206,577

[22] Filed: Jun. 14, 1988

[30] Foreign Application Priority Data

Dec. 10, 1987 [JP] Japan .............................. 62-314588

[51] Int. Cl.$^4$ ............................................... F25B 1/00
[52] U.S. Cl. ................................... 62/228.3; 62/228.5; 62/227; 62/244
[58] Field of Search ................. 62/228.3, 228.4, 228.5, 62/227, 229, 231, 234, 151, 155, 156, 80, 244, 157, 158

[56] References Cited

U.S. PATENT DOCUMENTS

| | | | |
|---|---|---|---|
| 4,350,021 | 9/1982 | Lundstrom | 62/80 X |
| 4,561,260 | 12/1985 | Nisho et al. | 62/228.5 X |
| 4,646,535 | 3/1987 | Matsuoka et al. | 62/228.3 X |
| 4,667,480 | 5/1987 | Bessler | 62/228.4 X |

FOREIGN PATENT DOCUMENTS

57-165684 10/1982 Japan .

Primary Examiner—Harry B. Tanner
Attorney, Agent, or Firm—Frishauf, Holtz, Goodman & Woodward

[57] ABSTRACT

An air-conditioning control system for automotive vehicles, comprising a compressor variable in capacity in accordance with a change in suction pressure thereof. A controller is provided which carries out demisting control, on the basis of output signals from various sensors, in such a manner that, when outdoor-air temperature is equal to or lower than a predetermined value and at the same time the air-conditioning control system is in the indoor-air recirculating mode, the suction pressure set by the controller is lowered to a value at which temperature on the outlet side of an evaporator is brought to a value equal to or lower than a predetermined freezing temperature, and when a state in which freezing of the evaporator may occur has continued for a predetermined period of time, the set suction pressure of the compressor is raised until the temperature on the outlet side of the evaporator is brought to a value equal to or higher than a predetermined non-freezing temperature.

6 Claims, 6 Drawing Sheets

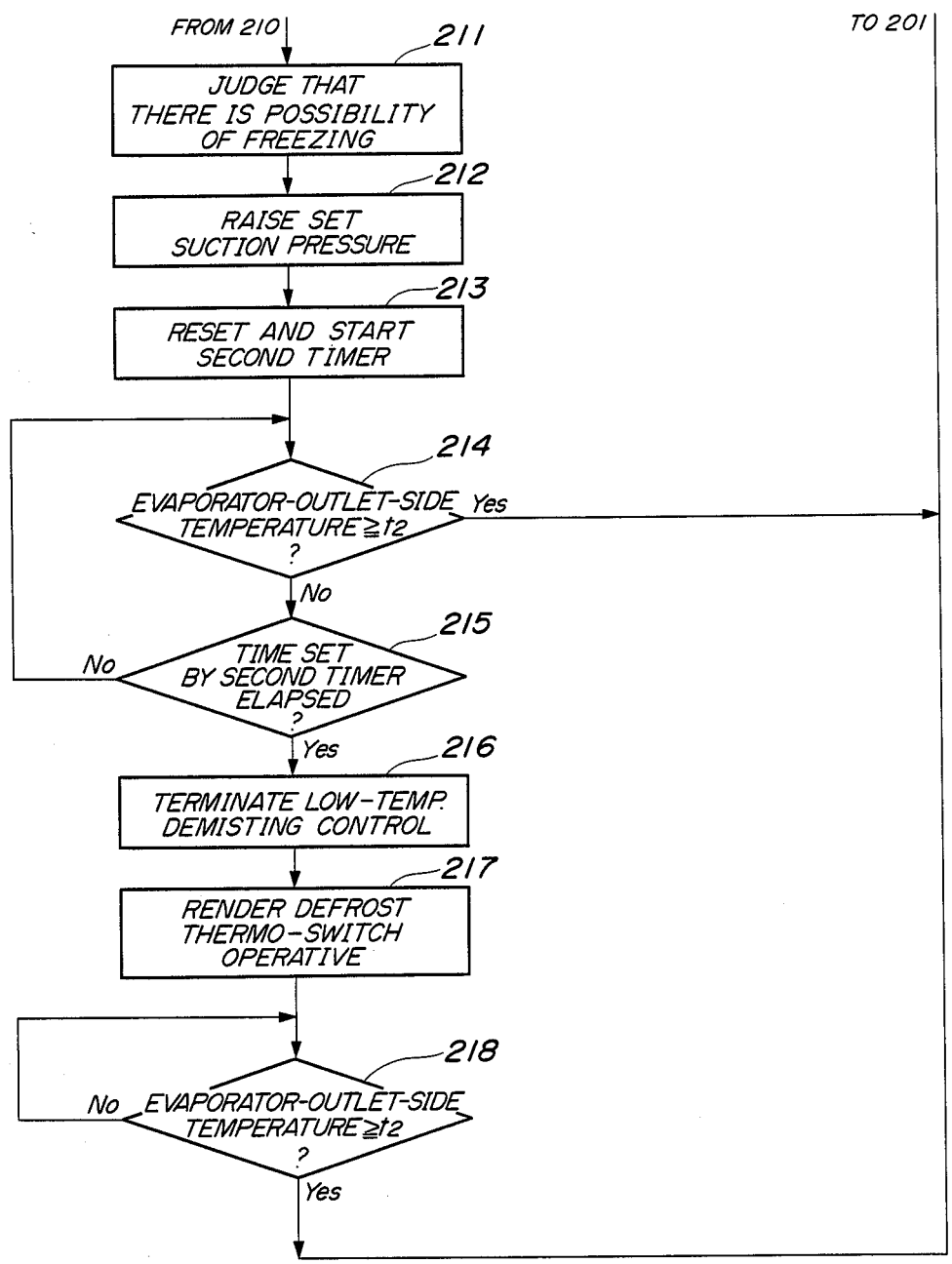
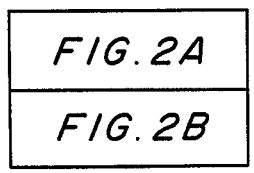
FIG. 2

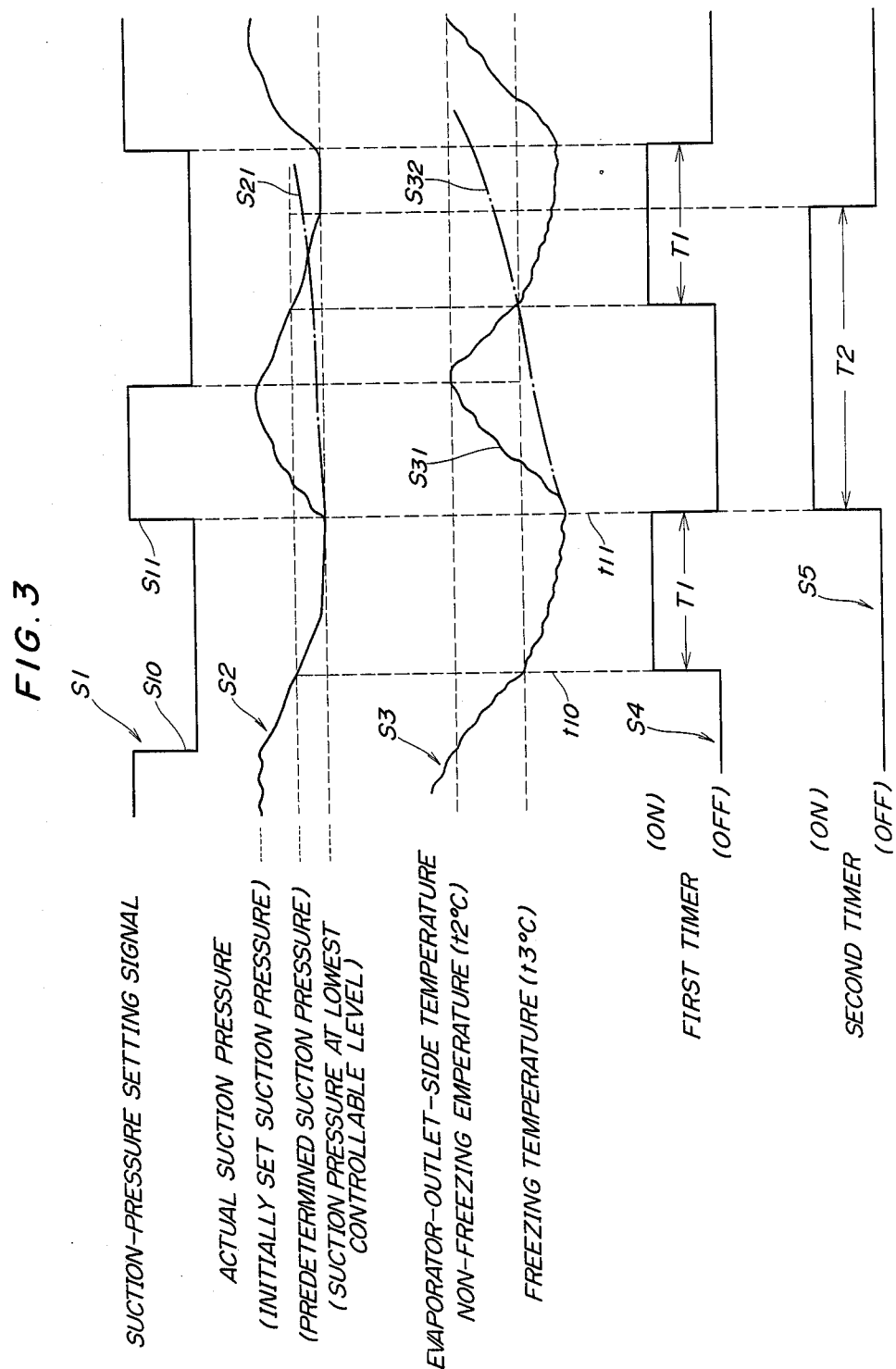

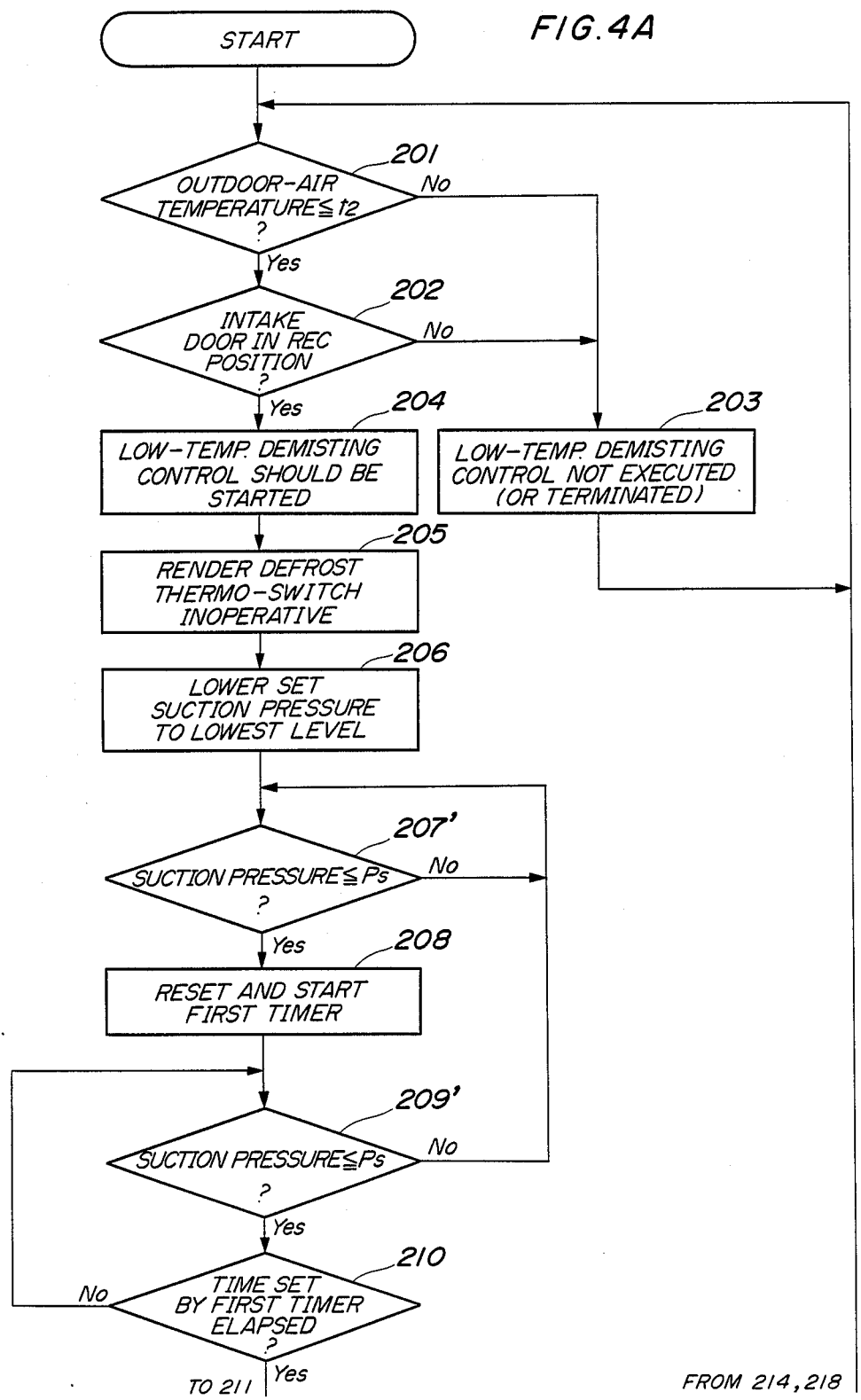

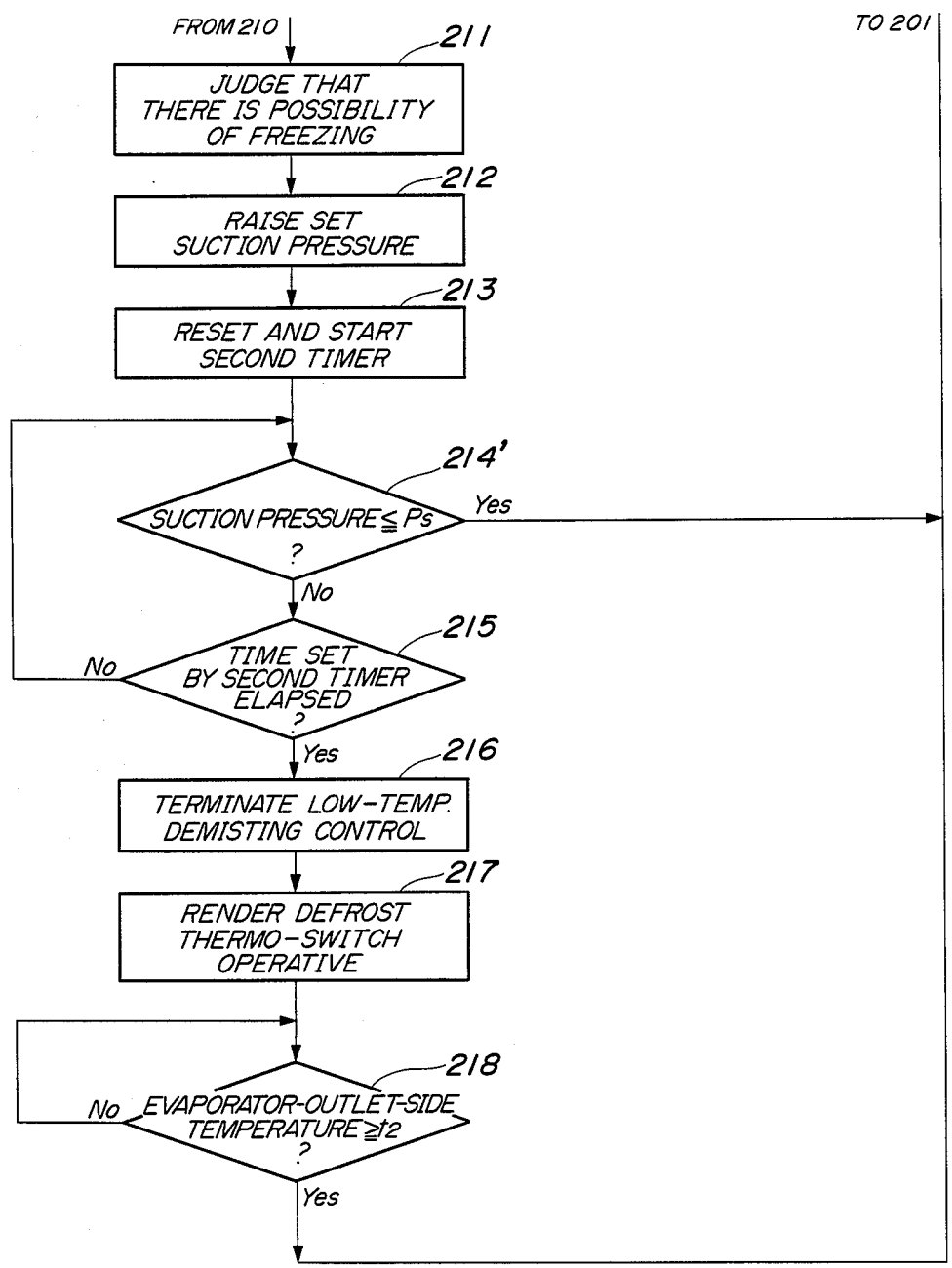
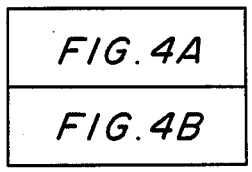
FIG.4B
FIG.4

AIR-CONDITIONING CONTROL SYSTEM FOR AUTOMOTIVE VEHICLES

BACKGROUND OF THE INVENTION

The present invention relates to an air-conditioning control system for automotive vehicles, which comprises a compressor of variable capacity type in which in response to an electric signal from the outside, the suction pressure is set to a selected one of various different values, to thereby enable the capacity to be varied in accordance with the set suction pressure.

Conventionally, an air-conditioning control system for automotive vehicles has been proposed, e.g. by Japanese Provisional Patent Publication (Kokai) No. 57-165684, in which the temperature or refrigerant pressure of an evaporator is detected as a parameter representative of the cooling degree of the evaporator, and the suction pressure of a variable capacity compressor is set on the basis of a signal indicative of the detected value, thereby effecting capacity control of the compressor.

In the conventional air-conditioning control system described above, the capacity control is carried out in the following manner. That is, for the purpose of prevention of the evaporator from being frozen, the suction pressure is set to a relatively high value to bring the capacity of the compressor to a relatively low value, so as to prevent the temperature on the outlet side of the evaporator from being lowered to a value equal to or lower than the freezing limit value. Because of such arrangement, in cold weather, when the air-conditioning control system is brought to a control mode carrying out demisting to remove mist on the front window pane of the automotive vehicle, if an intake door of the system is in a position to recirculate the indoor air, the demisting performance is insufficient or the demisting control is impossible, because the variable capacity compressor is in a low capacity running state or in a halt state.

SUMMARY OF THE INVENTION

It is the object of the invention to provide an improved air conditioning control system for automotive vehicles which is capable of carrying out demisting control in cold weather, while preventing the evaporator from being frozen.

According to the present invention, an air-conditioning control system comprises a compressor which is variable in capacity in accordance with a change in suction pressure thereof; an evaporator having an outlet side; and control means arranged outside of the compressor for supplying the compressor with an electric signal for setting the suction pressure. The system further includes a first sensor for detecting outdoor-air temperature, a second sensor for detecting whether or not the air-conditioning control system is in an indoor-air recirculating mode; a third sensor for detecting temperature on the outlet side of the evaporator; and a fourth sensor for detecting the suction pressure of the compressor. The first through fourth sensors are connected to the control means. The control means carries out the below-mentioned demisting control, on the basis of output signals from the respective first through fourth sensors.

(i) when the outdoor-air temperature is equal to or lower than a predetermined value and at the same time the air-conditioning control system is in the indoor-air recirculating mode, the suction pressure set by the control means is lowered to a value at which the temperature on the outlet side of the evaporator is brought to a value equal to or lower than a predetermined freezing temperature; and (ii) when a state in which freezing of the evaporator may occur has continued for a predetermined period of time, the suction pressure set by the control means is raised until the temperature on the outlet side of the evaporator is brought to a value equal to or higher than a predetermined non-freezing temperature.

BRIEF DESCRIPTION OF THE DRAWINGS

FIGS. 2A and 2B connected as shown in FIG. 2 show a flow chart of a program for executing demisting control by a low-temperature demisting control unit illustrated in FIG. 1;

FIG. 3 is a timing chart showing the relationship between a suction-pressure setting signal, an actual suction pressure signal, an evaporator-outlet-side temperature signal, a first timer-operating signal and a second timer-operating signal, obtained at various sections illustrated in FIG. 1; and FIGS. 4A and 4B connected as shown in FIG. 4 show a flow chart showing another example of the program for executing demisting control by the low-temperature demisting control unit illustrated in FIG. 1.

DETAILED DESCRIPTION

The invention will be described with reference to the drawings. Throughout the following description all temperature are in degrees Centigrade.

Figure 1:
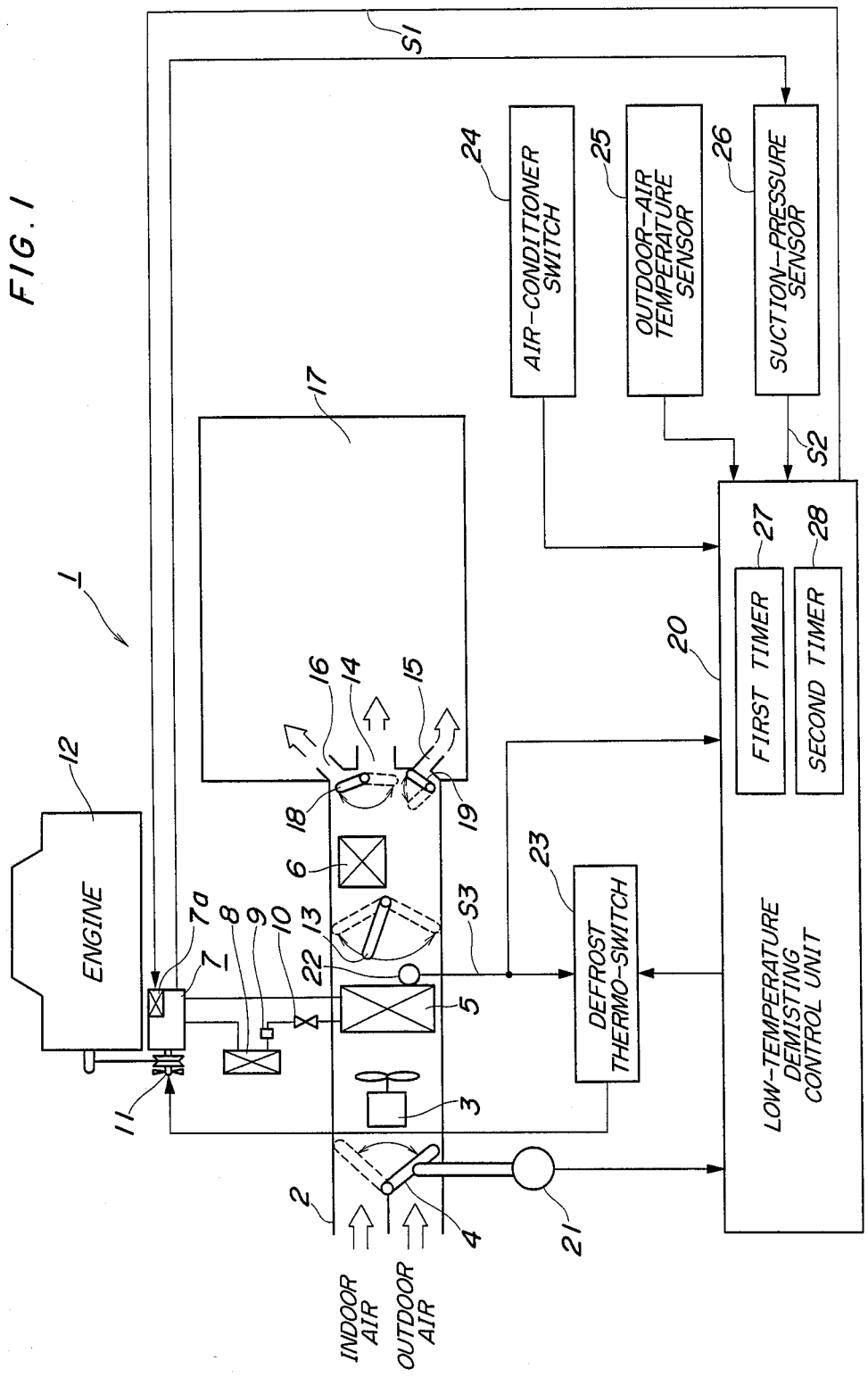
FIG. 1 is a schematic view of an air-conditioning control system for automotive vehicles, according to an embodiment of the invention.

Referring first to FIG. 1, there is illustrated an air-conditioning control system for automotive vehicles, according to an embodiment of the invention.

As shown in FIG. 1, a duct 2 is arranged which has upstream and downstream ends located respectively on the left-hand side and the right-hand side as viewed in FIG. 1. A blower 3 is arranged within the duct 2 and adjacent the upstream end thereof, for drawing air into the duct 2. An intake door 4 is arranged upstream of the blower 3 and can be switched to a selected one of a position of an outdoor-air introducting mode or a FRESH mode and a position of an indoor-air recirculating mode or a REC mode. An evaporator 5 and a heater core 6 are arranged downstream of the blower 3. The evaporator 5 constitutes a refrigerating cycle, together with a variable capacity compressor 7, a condenser 8, a receiver 9 and an automatic expansion valve 10 of heat-sensitive type.

The variable capacity compressor 7 is of a type in which internal control is so carried out automatically as to bring the suction pressure to a predetermined value, and the suction pressure is also controlled on the basis of an electric signal from the outside, i.e. from a low-temperature demisting control unit 20 to enable the capacity to be varied. The compressor 7 has a drive shaft which is connected to an engine 12 through an electromagnetic clutch 11 such that when the electromagnetic clutch 11 is in an engaged position, rotation of the engine 12 is transmitted to the drive shaft to rotatively drive the compressor 7. Further, the compressor 7 is provided with an electromagnetic actuator 7a which operates in such a manner that the suction pressure rises in proportion to an increase of an electric current value (a suction-pressure setting signal S1 shown in FIG. 3) that is the aforesaid electric signal supplied from the low-temperature demisting control unit 20 to an electromagnetic coil (not shown) of the actuator 7a. As known, as the suction pressure rises, the temperature on the outlet side of the evaporator 5 rises. Moreover, as the suction pressure rises, a capacity controller (not shown) incorporated in the compressor 7 is operated to decrease the capacity. On the other hand, the lower the electric-current value, that is, the low the value of the suction-pressure setting signal S1, the more the suction pressure drops, so that the temperature on the outlet side of the evaporator 5 drops and the capacity controller is operated to increase the capacity.

The heater core 6 is incorporated in a hot-water cycle through which cooling water for the engine 12 is recirculated. Air is heated by the recirculated cooling water while passing the heater core 6.

An air-mix door 13 is arranged within a portion of the duct 2 between the evaporator 5 and the heater core 6. A mixture ratio between hot air passing through the heater core 6 and cold air bypassing the heater core 6 is adjusted in accordance with the opening degree of the air-mix door 13.

The downstream end of the duct 2 is trifurcated into a blowoff outlet 14 directed toward the face of an occupant, a blowoff outlet 15 directed toward the feet of the occupant, and a defrost blowoff outlet 16. These outlets open, at their respective predetermined positions, into a vehicle compartment 17. Mode-switching doors 18 and 19 are provided at the trifurcated section, for switching blowoff modes.

Connected to the intake door 4 is a potentiometer 21 which, when the indoor-air recirculating mode is selected, detects pivotal movement of the intake door 4 to the position indicated by the sold lines in FIG. 1, to output the indoor-air recirculating mode (REC) signal to the low-temperature demisting control unit 20 composed of a microcomputer.

Arranged downstream of the evaporator 5 is an evaporator-temperature sensor 22 which detects temperature on the outlet side of the evaporator 5, for example, the temperature of fins on the outlet side of the evaporator 5 or the temperature of air blown out of the evaporator 5, to output a signal (evaporator-outlet-side temperature signal S3 shown in FIG. 3) indicative of the detected temperature. The evaporator-outlet-side temperature signal S3 from the evaporator-temperature sensor 22 is inputted to the low-temperature demisting control unit 20 and also to a defrost thermo-switch 23. The arrangement of the defrost thermo-switch 23 is such that the defrost thermo-switch 23 brings the electromagnetic clutch 11 to the engaged position to render the compressor 7 operative when the evaporator-outlet side temperature signal S3 from the evaporator-temperature sensor 22 indicates that the temperature on the outlet side of the evaporator 5 is equal to or higher than a predetermined non-freezing temperature $t_2$ (2° C., for example), while the defrost thermo-switch 23 brings the electromagnetic clutch 11 to the disengaged position to halt the operation of the compressor 7 when the evaporator-outlet-side temperature signal S3 indicates that the temperature on the outlet side of the evaporator 5 is equal to or lower than a predetermined freezing temperature $t_3$ (0 (zero) °C., for example).

Inputted to input terminals of the low-temperature demisting control unit 20 are respective output signals from the potentiometer 21 and the evaporator-temperature sensor 22, as well as ON- and OFF-signals from an air-conditioner switch 24 (or an auto-switch) indicative respectively of operation and non-operation of the air-conditioning control system, an outdoor-air temperature signal from an outdoor-air temperature sensor 25 for detecting the temperature of outdoor air, a suction-pressure signal (suction-pressure signal S2 shown in FIG. 3) from a suction-pressure sensor 26 for detecting the actual suction pressure of the compressor 7.

The low-temperature demisting control unit 20 has a pair of output terminals which are connected respectively to the input terminal of the electromagnetic actuator 7a and the input terminal of the defrost thermo-switch 23. The suction-pressure setting signal S1 is outputted from the low-temperature demisting control unit 20 to the electromagnetic actuator 7a. Further, the following control signal is outputted from the low-temperature demisting control unit 20 to the defrost thermo-switch 23. That is, when the outdoor-air temperature is equal to or lower than a predetermined value $t_1$ (4° C., for example) and when the air-conditioning control system is in the indoor-air recirculating mode, the control signal renders the defrost thermo-switch 23 inoperative, or lowers the predetermined freezing temperature $t_3$ (0° C.) to render the defrost thermo-switch 23 substantially inoperative.

Moreover, the low-temperature demisting control unit 20 has incorporated therein a first timer 27 having a first preset period of time T1 and a second timer 28 having a second preset period of time T2.

Figure 2A:
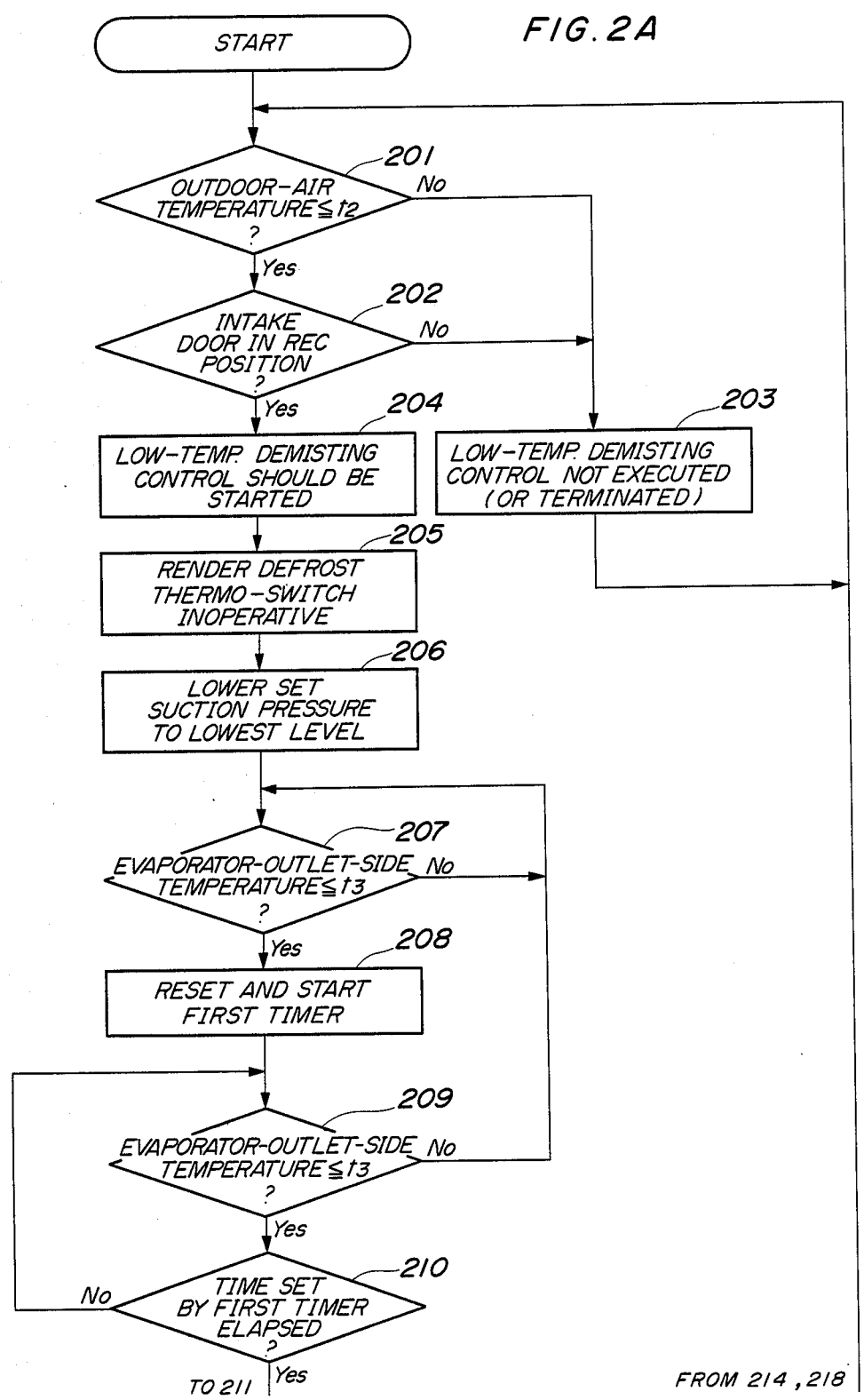

The operation of the air-conditioning control system 1 for automotive vehicles constructed as above will be described, in particular, the operation of the low-temperature demisting control unit 20, with reference to FIGS. 2A, 2B and 3.

The low-temperature demisting control unit 20 begins to operate in response to the ON-signal from the air-conditioner switch 24, and determines at a step 201 whether or not the outdoor-air temperature signal outputted from the outdoor-air temperature sensor 25 indicates a value equal to or lower than the predetermined value $t_1$ (4° C.). If the answer to the question of the step 201 is affirmative ("YES"), the program proceeds to a step 202, while if the answer is negative ("NO"), the program proceeds to a step 203 where the low-temperature demisting control is not carried out or is terminated. At the step 202, it is determined whether or not the intake door 4 is in the position of the indoor-air recirculating mode, that is, whether or not the REC signal is outputted from the potentiometer 21. If the answer to the question of the step 202 is negative ("NO"), the program proceeds to the step 203, while if the answer is affirmative ("YES"), the program proceeds to a step 204.

At the step 204, the low-temperature demisting control unit 20 judges that the low-temperature demisting control should be started. The low-temperature demisting control unit 20 outputs the above-mentioned control signal to the defrost thermo-switch 23 to render the latter inoperative, or lowers the predetermined freezing temperature $t_3$ (0° C.) to render the defrost thermo-switch 23 substantially inoperative (step 205). In addition, the low-temperature demisting control unit 20 outputs the falling suction-pressure setting signal $S_{10}$ to the electromagnetic actuator 7a of the compressor 7, to lower the currently set suction pressure of the compressor 7 to a value (suction pressure at the lowest controllable level) at which the temperature on the outlet side of the evaporator 5 is brought to a value equal to or lower than the predetermined freezing temperature $t_3$ (0° C.), thereby starting the low-temperature demisting control. In response to the start-up of the low-temperature demisting control, the actual suction pressure of the compressor 7 drops from the initially set suction pressure toward the suction pressure at the lowest controllable level as indicated by the suction-pressure signal S2. Likewise, the temperature on the outlet side of the evaporator 5 also drops as indicated by the signal S3.

At a step 207, the low-temperature demisting control unit 20 determines whether or not the evaporator-outlet-side temperature signal S3 outputted from the evaporator-temperature sensor 22 indicates a value equal to or lower than the freezing temperature $t_3$ (0° C.). When the answer to the question of the step 207 is negative ("NO"), the program returns to the step 207, while if the answer is affirmative ("YES"), the program proceeds to a step 208 to reset and start the first timer 27. That is, the low-temperature demisting control unit 20 starts the first timer 27 when the temperature on the outlet side of the evaporator 5 is brought to the freezing temperature $t_3$ (0° C.).

After the start-up of the first timer 27, it is again determined whether or not the evaporator-outlet-side temperature signal S3 indicates a value equal to or lower than the freezing temperature $t_3$ (0° C.). If the answer is negative ("NO"), the program returns to the step 207, while if the answer is affirmative ("YES"), the program proceeds to a step 210. At the step 210, it is determined whether or not the first preset period of time T1 (10 seconds, for example) has elapsed. If the answer at the step 210 is negative ("NO"), the program returns to the step 209. On the other hand, if the answer to the question of the step 210 is affirmative ("YES"), that is, when the temperature on the outlet side of the evaporator 5 has continually been equal to or lower than the freezing temperature $t_3$ (0° C.) for a period of time equal to or longer than the first preset period of time T1, the low-temperature demisting control unit 20 judges at a step 211, that there is the possibility of freezing. At a step 212, the control unit 20 outputs the rising suction-pressure setting signal $S_{11}$ to the electromagnetic actuator 7a of the compressor 7, to raise the set suction pressure of the compressor 7 from the suction pressure at the aforesaid lowest level to the value (the initially set suction pressure) at which the temperature on the outlet side of the evaporator 5 is brought to the predetermined non-freezing temperature $t_2$ (2° C.). At this time, the low-temperature demisting control unit 20 resets and starts the second timer 28 (step 213), at the same time (the point of time $t_{11}$) as the start-up of raising of the set suction pressure at the step 212.

After the start-up of the second timer 28, it is determined at a step 214 whether or not the evaporator-outlet-side temperature signal S3 indicates a value equal to or higher than the non-freezing temperature $t_2$ (2° C.). If the answer at the step 214 is affirmative ("YES"), that is, when the temperature on the outlet side of the evaporator 5 rises abruptly as depicted by a rising curve $S_{31}$ of the evaporator-outlet-side temperature signal S3 indicated by the solid line, in response to the start-up of raising of the set suction pressure at the step 212, so that the temperature on the outlet side of the evaporator 5 reaches the non-freezing temperature $t_2$ (2° C.), the program returns to the step 201 and the above-described low-temperature demisting control is again executed. On the other hand, if the answer to the question of the step 214 is negative ("NO"), that is, when the temperature on the outlet side of the evaporator 5 rises gently as depicted by a rising curve $S_{32}$ of the evaporator-outlet-side temperature signal S3 indicated by the dot-and-chain line, in response to the start-up of raising of the set suction pressure at the step 212, so that the temperature on the outlet side of the evaporator 5 does not reach the non-freezing temperature $t_2$ (2° C.), the program proceeds to a step 215. At the step 215, it is determined whether or not the second preset period of time T2 (30 seconds, for example) has elapsed. If the answer at the step 215 is negative ("NO"), the program returns to the step 214. On the other hand, if the answer at the step 215 is affirmative ("YES"), that is, when the temperature on the outlet side of the evaporator 5 does not reach the non-freezing temperature $t_2$ (2° C.) even after the lapse of the second preset period of time T2 from the point of time $t_{11}$, the low-temperature demisting control is terminated (step 216), and the defrost thermo-switch 23 is returned to the operative position (step 217). If the temperature on the outlet side of the evaporator 5 is higher than or equal to or lower than the predetermined freezing temperature $t_3$ (0° C.), the defrost thermo-switch 23 returned to its operative position brings the electromagnetic clutch 11 respectively to the engaged position or to the disengaged position, to respectively operate or halt the compressor 7, thereby preventing the evaporator 5 from being frozen.

At a step 218, the low-temperature demisting control unit 20 again determines whether or not the temperature on the outlet side of the evaporator 5 is equal to or higher than the non-freezing temperature $t_2$ (2° C.). If the answer at the step 218 is negative ("NO"), the program returns to the step 218, while if the answer is affirmative ("YES"), the program returns to the step 201.

Although in the above embodiment, it is judged that there is the possibility of freezing when the temperature on the outlet side of the evaporator has continually been equal to or lower than $t_3$ (0° C.) for a period of time equal to or longer than the first preset period of time T1, the invention is not limited to this specific form. Alternatively, the arrangement may be such that it is judged that there is the possibility of freezing when the suction-pressure signal S2 from the suction-pressure sensor 26 has continually indicated a value equal to or lower than the predetermined suction pressure for a period of time equal to or longer than the first preset period of time T1. Further, the arrangement of the invention may be such that the demisting control is terminated when the actual suction pressure does not reach the predetermined suction pressure even after the second preset period of time T2 has elapsed from the point of time $t_{11}$ (at the start-up of raising of the set suction pressure) at which the second timer 28 is started as depicted by the gently rising curve $S_{21}$ of the suction-pressure signal S2 indicated by the dot-and-chain line.

That is, as shown in FIGS. 4A and 4B, it may be determined at steps 207', 209' and 214' whether or not the suction pressure is equal to or lower than a predetermined value Ps. The remaining steps shown in FIGS. 4A and 4B are the same as those illustrated in FIGS. 2A and 2B and description of the remaining steps is therefore omitted.

As described above in detail, the arrangement of the air-conditioning control system for automotive vehicles according to the invention is such that low-temperature demisting control means is provided in which when the outdoor-air temperature is equal to or lower than the predetermined value and when the air-conditioning control system is in the indoor-air recirculating mode, the set suction pressure of the compressor is lowered to a value at which the temperature on the outlet side of the evaporator is brought to a value equal to or lower than the predetermined freezing temperature, and when the temperature on the outlet side of the evaporator has continually been equal to or lower than the freezing temperature or when the actual suction pressure of the compressor has continually been equal to or lower than the predetermined value for a period of time equal to or longer than the predetermined period of time, the set suction pressure is raised to a value bringing the temperature on the outlet side of the evaporator to the predetermined non-freezing temperature. With such arrangement, it is possible to carry out the low-temperature demisting control while preventing the evaporator from being frozen, in a winter season or the like in which the outdoor-air temperature is low.

What is claimed is:

1. An air-conditioning control system for automotive vehicles, comprising:
    a variable capacity compressor variable in capacity in accordance with a change in suction pressure thereof;
    an evaporator having an outlet side;
    control means arranged outside of said compressor for supplying said compressor with an electric signal for setting the suction pressure;
    first sensor means for detecting outdoor-air temperature;
    second sensor means for detecting whether or not the air-conditioning control system is in an indoor-air recirculating mode;
    third sensor means for detecting temperature on the outlet side of said evaporator;
    fourth sensor means for detecting the suction pressure of said compressor; and
    said first through fourth sensor means being connected to said control means;
    said control means carrying out the below-mentioned demisting control, on the basis of output signals from the respective first through fourth sensor means:
    (i) when the outdoor-air temperature is equal to or lower than a predetermined value and at the same time the air-conditioning control system is in the indoor-air recirculating mode, the suction pressure set by said control means is lowered to a value at which the temperature on the outlet side of said evaporator is brought to a value equal to or lower than a predetermined freezing temperature; and
    (ii) when a state in which freezing of said evaporator may occur has continued for a predetermined period of time, the suction pressure set by said control means is raised until the temperature on the outlet side of said evaporator is brought to a value equal to or higher than a predetermined non-freezing temperature.

2. An air-conditioning control system for automotive vehicles according to claim 1, wherein said state in which freezing of said evaporator may occur is a state in which the temperature on the outlet side of said evaporator is equal to or lower than said predetermined freezing temperature.

3. An air-conditioning control system for automotive vehicles according to claim 1, wherein said state in which freezing of said evaporator may occur is a state in which actual suction pressure of said compressor is equal to or lower than a predetermined value.

4. An air-conditioning control system for automotive vehicles according to claim 2, wherein the raising of said set suction pressure in response to the continued state in which freezing of said evaporator may occur is effected only for a second predetermined period of time insofar as the temperature on the outlet side of said evaporator is equal to or lower than said predetermined non-freezing temperature.

5. An air-conditioning control system for automotive vehicles according to claim 3, wherein the raising of said set suction pressure in response to the continued state in which freezing of said evaporator may occur is effected only for a second predetermined period of time insofar as the actual suction pressure of said compressor is equal to or lower than said predetermined valve.

6. An air-conditioning control system for automotive vehicles according to claim 1, including thermo-switch means connected to said compressor, said control means and said third sensor means, said thermo-switch means being operable when said demisting control is not executed, in a manner such that when the temperature on the outlet side of said evaporator is equal to or higher than said predetermined non-freezing temperature, said thermo-switch means renders said compressor operative, while when the temperature on the outlet side of said evaporator is equal to or lower than said predetermined freezing temperature, said thermo-switch means renders said compressor inoperative, thereby preventing said evaporator from being frozen.

* * * * *